US008582140B2

(12) United States Patent
Sekiguchi

(10) Patent No.: US 8,582,140 B2
(45) Date of Patent: Nov. 12, 2013

(54) COMMUNICATION SYSTEM AND COMMUNICATION APPARATUS BUILDING THE SYSTEM

(75) Inventor: Kenzo Sekiguchi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 11/459,115

(22) Filed: Jul. 21, 2006

(65) Prior Publication Data

US 2007/0046981 A1 Mar. 1, 2007

Related U.S. Application Data

(63) Continuation of application No. 10/623,687, filed on Jul. 22, 2003, now Pat. No. 7,106,473, which is a continuation of application No. 09/123,145, filed on Jul. 27, 1998, now Pat. No. 7,280,239.

(30) Foreign Application Priority Data

Aug. 1, 1997 (JP) .................................. 9-207927

(51) Int. Cl.
*G06F 3/12* (2006.01)
(52) U.S. Cl.
USPC .......................................... 358/1.15; 358/1.1
(58) Field of Classification Search
USPC ......... 358/407, 402, 1.15, 442, 438, 2.1, 462, 358/1.1; 370/352, 428, 407; 379/102.02, 379/100.08, 88.13; 709/206, 246; 382/173–180
See application file for complete search history.

(56) References Cited

U.S. PATENT DOCUMENTS

| 4,558,369 | A | * | 12/1985 | Shinohara et al. ............ 358/434 |
| 5,406,557 | A | | 4/1995 | Baudoin ....................... 370/407 |
| 5,442,686 | A | | 8/1995 | Wada et al. ................ 379/88.13 |
| 5,521,719 | A | | 5/1996 | Yamada ........................ 358/438 |
| 5,608,786 | A | | 3/1997 | Gordon ........................ 370/352 |
| 5,742,905 | A | | 4/1998 | Pepe et al. ..................... 455/461 |
| 5,767,985 | A | | 6/1998 | Yamamoto et al. ........... 358/402 |
| 5,812,278 | A | | 9/1998 | Toyoda et al. ................ 358/402 |
| 5,838,461 | A | | 11/1998 | Hsieh ............................ 358/442 |

(Continued)

FOREIGN PATENT DOCUMENTS

| EP | 0 465 011 A2 | 1/1992 |
| EP | 0785482 A2 | 7/1997 |

(Continued)

OTHER PUBLICATIONS

Japanese Office Action dated Mar. 15, 2005.

(Continued)

*Primary Examiner* — King Poon
*Assistant Examiner* — Iriana Cruz
(74) *Attorney, Agent, or Firm* — Rossi, Kimms & McDowell LLP

(57) ABSTRACT

Facsimile image data received from a normal facsimile apparatus connected to a general telephone network can be transmitted as an e-mail to the e-mail address of a computer network such as a LAN or the like designated by the source facsimile apparatus. An apparatus has a LAN I/F (6-14) for connecting to the LAN, and a line I/F (6-6) for connecting to the public telephone network. Upon reception of a remote instruction from the public telephone network, a CPU (6-3) converts received facsimile image data into e-mail data, and transmits the converted e-mail data to the e-mail address designated by the received remote instruction.

3 Claims, 7 Drawing Sheets

(56) References Cited

U.S. PATENT DOCUMENTS

| | | | |
|---|---|---|---|
| 5,838,685 A | 11/1998 | Hochman | 370/428 |
| 5,841,550 A * | 11/1998 | Johnson | 358/402 |
| 5,859,967 A * | 1/1999 | Kaufeld et al. | 726/5 |
| 5,872,845 A | 2/1999 | Feder | 358/402 |
| 5,881,233 A * | 3/1999 | Toyoda et al. | 709/233 |
| 6,008,908 A * | 12/1999 | Matsumoto et al. | 358/442 |
| 6,009,153 A | 12/1999 | Houghton et al. | 379/102.02 |
| 6,020,980 A | 2/2000 | Freeman | 358/402 |
| 6,023,345 A * | 2/2000 | Bloomfield | 358/402 |
| 6,023,700 A | 2/2000 | Owens et al. | 707/10 |
| 6,025,931 A | 2/2000 | Bloomfield | 358/402 |
| 6,028,679 A | 2/2000 | Murphy | 358/407 |
| 6,072,862 A | 6/2000 | Srinivasan | 379/100.08 |
| 6,141,695 A | 10/2000 | Sekiguchi et al. | 709/246 |
| 6,185,306 B1 * | 2/2001 | Mages et al. | 380/203 |
| 6,185,604 B1 | 2/2001 | Sekiguchi | 709/206 |
| 6,256,115 B1 | 7/2001 | Adler et al. | 358/442 |
| 2002/0063882 A1 | 5/2002 | Sekiguchi | 358/1.15 |
| 2002/0120850 A1 * | 8/2002 | Walker et al. | 713/178 |

FOREIGN PATENT DOCUMENTS

| | | |
|---|---|---|
| JP | 3-289756 | 12/1991 |
| JP | 6-350822 | 12/1994 |
| JP | 7-154569 | 6/1995 |
| JP | 8-125773 | 5/1996 |
| JP | 8-256235 | 10/1996 |
| JP | 9-102798 | 4/1997 |
| JP | 9-121274 | 5/1997 |
| JP | 9-172463 | 6/1997 |
| JP | 10-70643 | 3/1998 |
| JP | 10-126551 | 5/1998 |
| JP | 10-243205 | 9/1998 |
| WO | WO96/41463 * | 12/1996 |
| WO | WO 96/41463 | 12/1996 |
| WO | WO9641463 * | 12/1996 |
| WO | WO 97/10668 | 3/1997 |
| WO | WO 97/18665 | 5/1997 |
| WO | WO 97/26753 | 7/1997 |

OTHER PUBLICATIONS

Patel, et al. "The Multimedia Fax-MIME Gateway", IEEE Multimedia Journal, winter 1994, pp. 64-70.

European Patent Office Search Report, dated Feb. 20, 2007.

* cited by examiner

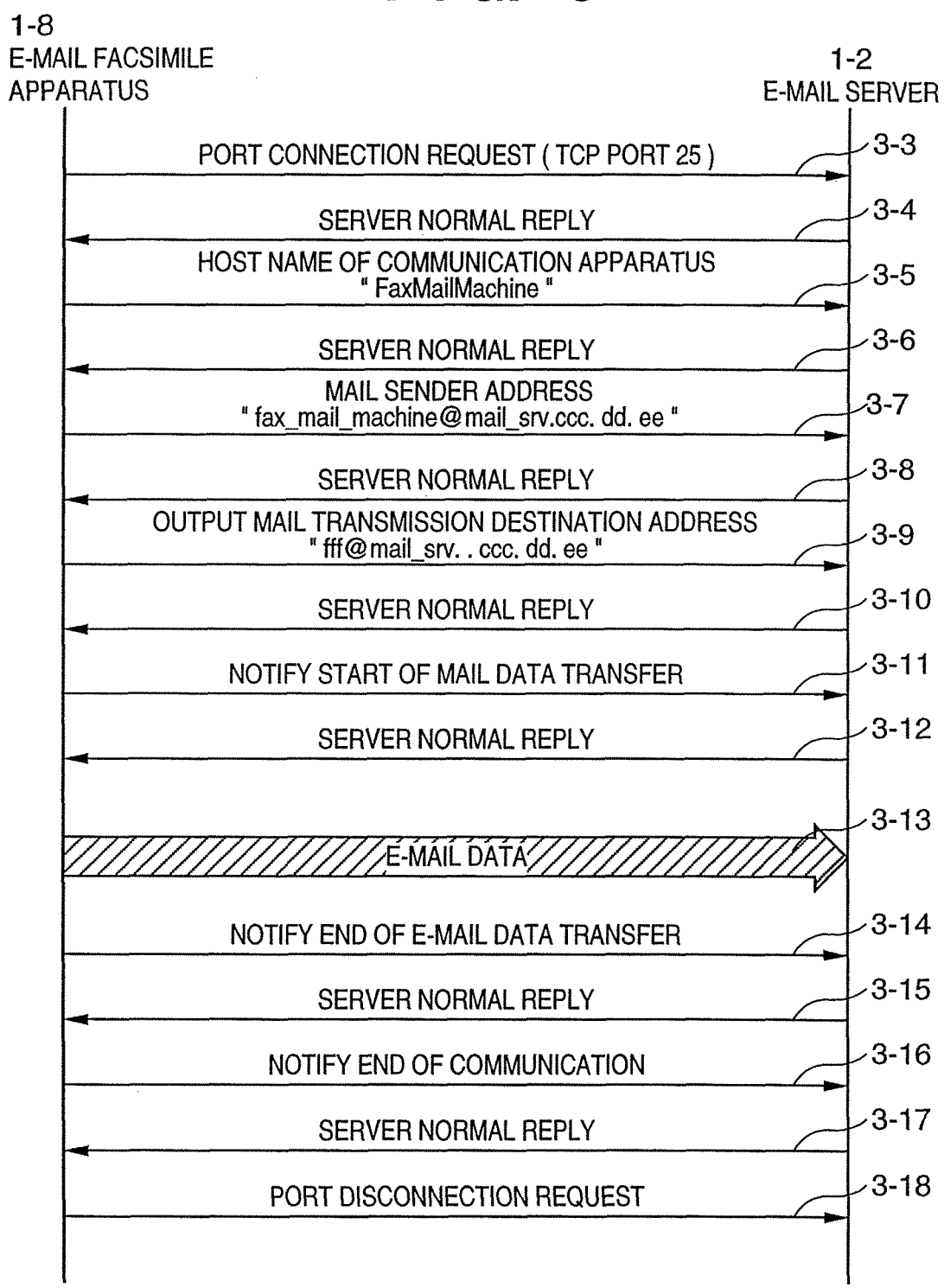

FIG. 4

| | | |
|---|---|---|
| 4-2 | OWN MAIL ACCOUNT<br>" mail_fax_machine@mail_srv.ccc.dd.ee " | |
| 4-3 | OWN HOST NAME<br>" FaxMailMachine " | |
| 4-4 | E-MAIL SERVER HOST NAME<br>" mail_srv " | |
| 4-5 | MODE<br>" FAX RECEPTION MODE " OR " LINE DISCONNECTION MODE " | |
| 4-6 | NUMBER OF E-MAIL DESTINATIONS<br>" 10 " | |
| 4-7 | E-MAIL ADDRESS<br>" username1@mail_srv.ccc.dd.ee " | DESTINATION SEQUENCE [1] — 4-1 |
| 4-9 | E-MAIL DESTINATION IDENTIFICATION INFORMATION " 3737 " | |
| 4-10 | PASSWORD INFORMATION<br>" 1111 " | |
| 4-11 | NUMBER OF RECEIVED PAGES | |
| 4-21 | E-MAIL ADDRESS<br>" fff@mail_srv.ccc.dd.ee " | DESTINATION SEQUENCE [i] — 4-20 |
| 4-22 | E-MAIL DESTINATION IDENTIFICATION INFORMATION " 3939 " | |
| 4-23 | PASSWORD INFORMATION<br>" 8280 " | |
| 4-24 | CALL RECEPTION DATE<br>" 21:50, JUN 19. 1997 " | |
| 4-25 | SOURCE TELEPHONE NUMBER<br>" 03-111-2222 " | |
| 4-26 | PROCESSING RESULT NOTIFICATION FACSIMILE DESTINATION " 03-111-2222 " | |
| 4-27 | RECEPTION RESULT<br>" OK " | |
| 4-28 | NUMBER OF RECEIVED PAGES<br>" 3 " | |
| 4-41 | E-MAIL ADDRESS<br>" username10@mail_srv.ccc.dd.ee " | DESTINATION SEQUENCE [10] — 4-40 |
| 4-42 | E-MAIL DESTINATION IDENTIFICATION INFORMATION " 3636 " | |
| 4-43 | PASSWORD INFORMATION<br>" 7979 " | |
| 4-44 | NUMBER OF RECEIVED PAGES | |

FIG. 5

From : fax _mail _machine@_mail_srv.ccc.dd.ee
To : fff @mail__srv.ccc.dd.ee
Subject : FAX RECEIVED DOCUMENT VIA mail_fax_machine
Mime-Version : 1.0
Content-type : Multipart / Mixed ;
boundary = " ··· Boundary ··· "
Date : Thu, 19 Jun 1997 21:00:00 + 0999
Message-Id : <19970619215959.TAA99999@mail_srv.ccc.dd.ee>

··· Boundary ···
Content-type : text / Plain ; charset = iso-2022-jp

[MAIL CONTENT]   RECEIVED FAX IMAGE
  [FAX RECEIVER HOST ADDRESS]  FaxMailMachine.ccc.dd.ee
  [FAX RECEPTION DATE]  21 : 50, JUN 19, 1997
  [FAX COMMUNICATION TIME]  5 min 33 sec
  [FAX SOURCE TELEPHONE NUMBER]  03-111-2222
  [RECEPTION RESULT]  OK
  [NUMBER OF RECEIVED PAGES]  3
  [FILE NAME]  "mail_fax_machine970619215959.tif"

··· Boundary ···
Content-Type : image / tiff
Content-Transfer-Encoding : base64
Content-Disposition : inline ; filename= " mail_fax_machine970619215959.tif"

FACSIMILE IMAGE ENCODED BY base64

··· Boundary ···

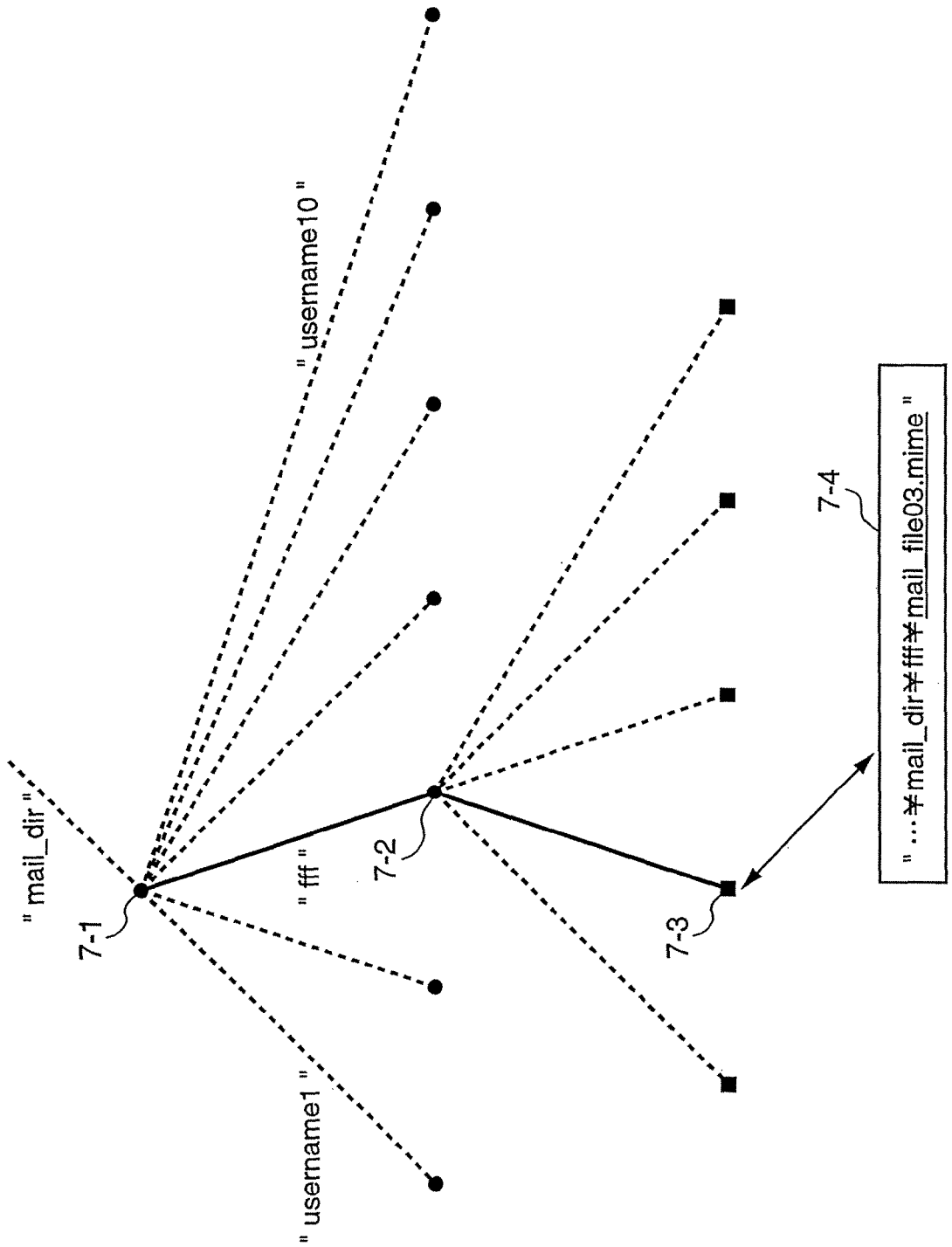

COMMUNICATION SYSTEM AND COMMUNICATION APPARATUS BUILDING THE SYSTEM

This is a continuation application of U.S. Ser. No. 10/623,687 filed Jul. 22, 2003 now U.S. Pat. No. 7,106,473 which is a continuation application of U.S. Ser. No. 09/123,145 filed Jul. 27, 1998 now U.S. Pat. No. 7,280,239, which are incorporated herein in their entirety.

BACKGROUND OF THE INVENTION

The present invention relates to a communication system which can exchange information between electronic information media such as e-mail media and the like, and facsimile media.

Recently, in addition to information exchange means such as facsimile, telephone, and the like via the telephone network, information retrieval of electronic information such as e-mails and the like via the Internet has prevailed. Paying attention to e-mails, not only character information but also various other data formats such as image data, audio data, computer data, and the like can be exchanged. Each e-mail user has his or her own postoffice (or a mailbox (P.B.O)) in an e-mail server equipped in a given company. E-mails sent to the individual users are temporarily stored in their postoffices. After that, these e-mails are received by e-mail client software installed in a personal computer (to be referred to as a PC hereinafter) or the like in an office, which is connected to the e-mail server via a LAN or the Internet, or directly to the telephone network.

Furthermore, a communication apparatus or facsimile server apparatus called "Internet FAX" that combines the facsimile apparatus and e-mail function has become available.

The Internet FAX apparatus is principally used as an equipment called a network scanner for capturing read image data into a computer. The Internet FAX apparatus has a function of converting image data captured by reading an original into an e-mail data format, and transmitting that data to a desired e-mail address designated by the transmitting side. This service is called an Internet FAX mail transmission service.

On the other hand, as for a function of receiving facsimile image data by the Internet FAX apparatus or facsimile server apparatus, the received image data cannot be transmitted to the e-mail address designated by the transmitting facsimile apparatus. For example, the following system is already available. That is, facsimile server apparatuses introduced in a given enterprise are connected to each other via an intranet, and a certain server receives facsimile data, which contains a telephone number (to be referred to as a secondary telephone number hereinafter) of the final destination facsimile apparatus. That server selects another server, which can make the communication charge lowest, by looking up a telephone charge table based on the secondary telephone number, and telephone numbers of local servers.

In the above-mentioned prior art, the Internet FAX apparatus can designate an e-mail address. However, in the Internet FAX secondary relaying service, a normal facsimile apparatus (a normal G3 facsimile apparatus) that facsimile-transmits data to the primary relaying Internet FAX apparatus cannot designate the e-mail address of the secondary relaying side. For example, the normal facsimile apparatus cannot post the received data to a user's e-mail postoffice (mailbox) via the Internet FAX apparatus, or cannot manually select the Internet FAX apparatus serving as the secondary relaying station using the Internet FAX secondary relaying service. This is because the e-mail address is described using alphanumeric letters, but a normal facsimile apparatus that complies with the existing ITU-T T.30 recommendation cannot directly transmit code data of a character string such as alphabets to the destination facsimile apparatus. Note that code data of a character string can be sent in an own company mode (own mode) using a non-standard protocol (NSF/NSS) of the T.30 recommendation, but facsimile apparatuses with which the server can communicate are limited.

SUMMARY OF THE INVENTION

It is an object of the present invention to provide a communication system and a communication apparatus building the system, which can transfer facsimile-received image data received from a public network to the e-mail address of a computer network designated by the operator at the source facsimile apparatus, and can transfer facsimile image data received from a facsimile apparatus connected to the public network to the e-mail address of the computer network as e-mail data.

It is another object of the present invention to provide a communication system and a communication apparatus building the system, which can assure security of the system by setting password information.

It is still another object of the present invention to provide a communication system and a communication apparatus building the system, which allow an apparatus connected to the public network to transmit transfer destination information, password information, or the like of an e-mail as numerical information, and require neither a complicated arrangement nor a special arrangement different from a normal facsimile apparatus.

According to the present invention, a communication apparatus comprises means for connecting a computer network such as a local area network, Internet, and the like, means for connecting to a public telephone network, facsimile reception means for receiving facsimile image data via the public telephone network, means for receiving transfer destination information of e-mail data from the public telephone network, conversion means for converting the received facsimile image data into an e-mail data format, and transmission means for designating an e-mail destination of the computer network on the basis of the received transfer destination information, and transmitting the e-mail data converted by the conversion means to the designated destination.

The apparatus also comprises destination designation means for designating the e-mail destination of the computer network on the basis of the received transfer destination information, and postoffice designation means for designating a desired postoffice in an e-mail server of the computer network.

The transfer destination information and password information are received from the public telephone network, it is checked if e-mail transfer destination information corresponding to the transfer destination information is set in advance and if the received password information matches password information set in advance, and the converted e-mail data is transmitted in accordance with the checking results.

The apparatus also comprises storage means for registering in advance e-mail address information of the e-mail destination in correspondence with numeral information, and the transfer destination information is received as numeral information, and the address information of the e-mail destination corresponding to the received numeral information is read out from the storage means to designate the e-mail destination.

The password information is received as numeral information.

The transfer destination information is received by a DTMF signal.

Whether the public telephone network is released or facsimile reception via the public telephone network is started can be selected when the transfer destination information and a signal related to a facsimile communication are not received within a prescribed time for monitoring signal reception from the public telephone network after call reception from the public telephone network.

The transfer destination information is received by a protocol signal (subaddress signal or selective polling signal of the T.30 recommendation) of a facsimile communication protocol.

The password information is received by a protocol signal (password signal of the T.30 recommendation) of a facsimile communication protocol.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows the sequence of the communication protocol between an e-mail facsimile apparatus 1-8 and e-mail server 1-2 of the embodiment of the present invention;

FIG. 4 shows management data;

FIG. 5 shows an example of the format of e-mail data;

FIG. 7 shows the directory structure in an auxiliary storage device in the e-mail server 1-2.

DESCRIPTION OF THE PREFERRED EMBODIMENTS

The preferred embodiment of the present invention will be described in detail hereinafter with reference to the accompanying drawings.

In the embodiment to be described hereinafter, a facsimile apparatus (e-mail facsimile apparatus) having an e-mail/facsimile conversion function will be exemplified as a communication apparatus.

Figure 1:
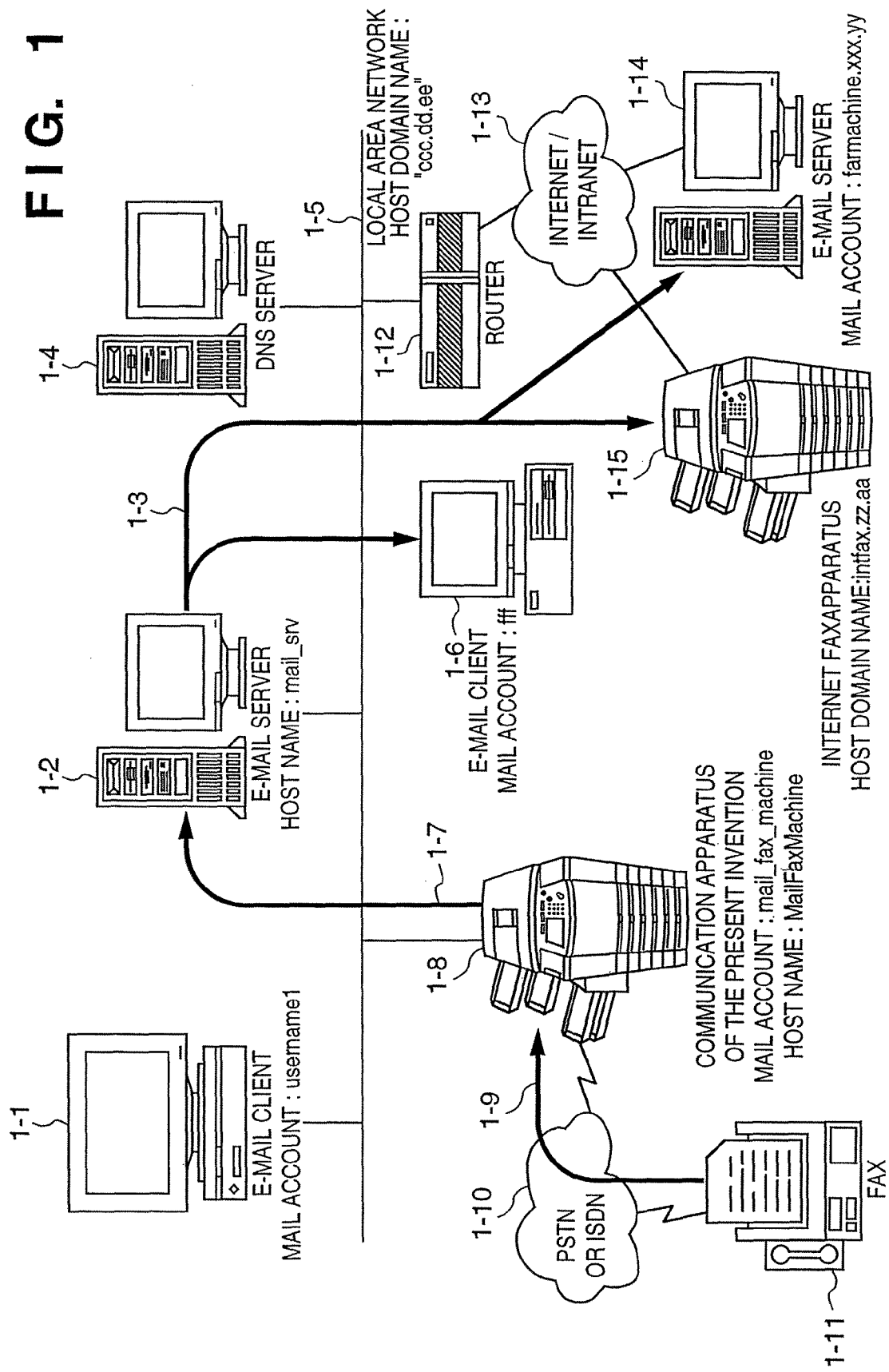
FIG. 1 is a diagram showing the connection pattern between the e-mail facsimile apparatus and network.

FIG. 1 shows an example of connections between the e-mail facsimile apparatus of this embodiment and the network.

E-mail clients 1-1 and 1-6, and an e-mail facsimile apparatus 1-8 of this embodiment are connected to a local area network (LAN) 1-5 (e.g., domain name "ccc.dd.ee"), and are assigned postoffices with a directory structure shown in FIG. 7 in an auxiliary storage device of an e-mail server 1-2. The mail accounts (postoffice names in this embodiment) of these clients and apparatus are respectively "username1", "fff", and "mail_fax_machine". The e-mail facsimile apparatus 1-8 of this embodiment has a facsimile communication function in addition to a transmission/reception function of e-mails, and is connected to a public telephone network (PSTN) or ISDN 1-10. The apparatus 1-8 can facsimile-communicate with a general remote facsimile apparatus 1-11 connected to the public telephone network.

Furthermore, the e-mail facsimile apparatus 1-8 of this embodiment is connected to an Internet/intranet 1-13 via a remote router 1-12, and can exchange e-mails with the above-mentioned terminals on the LAN 1-5, and an Internet FAX apparatus (e.g., host domain name "intfax.zzz.aa") 1-15 and e-mail server (e.g., host domain name "farmachine.xxx.yy") 1-14 connected to the Internet/intranet. In such communications, a DNS server 1-4 having a function of converting the host domain name of the destination into an IP address or vice versa is used.

Figure 6:
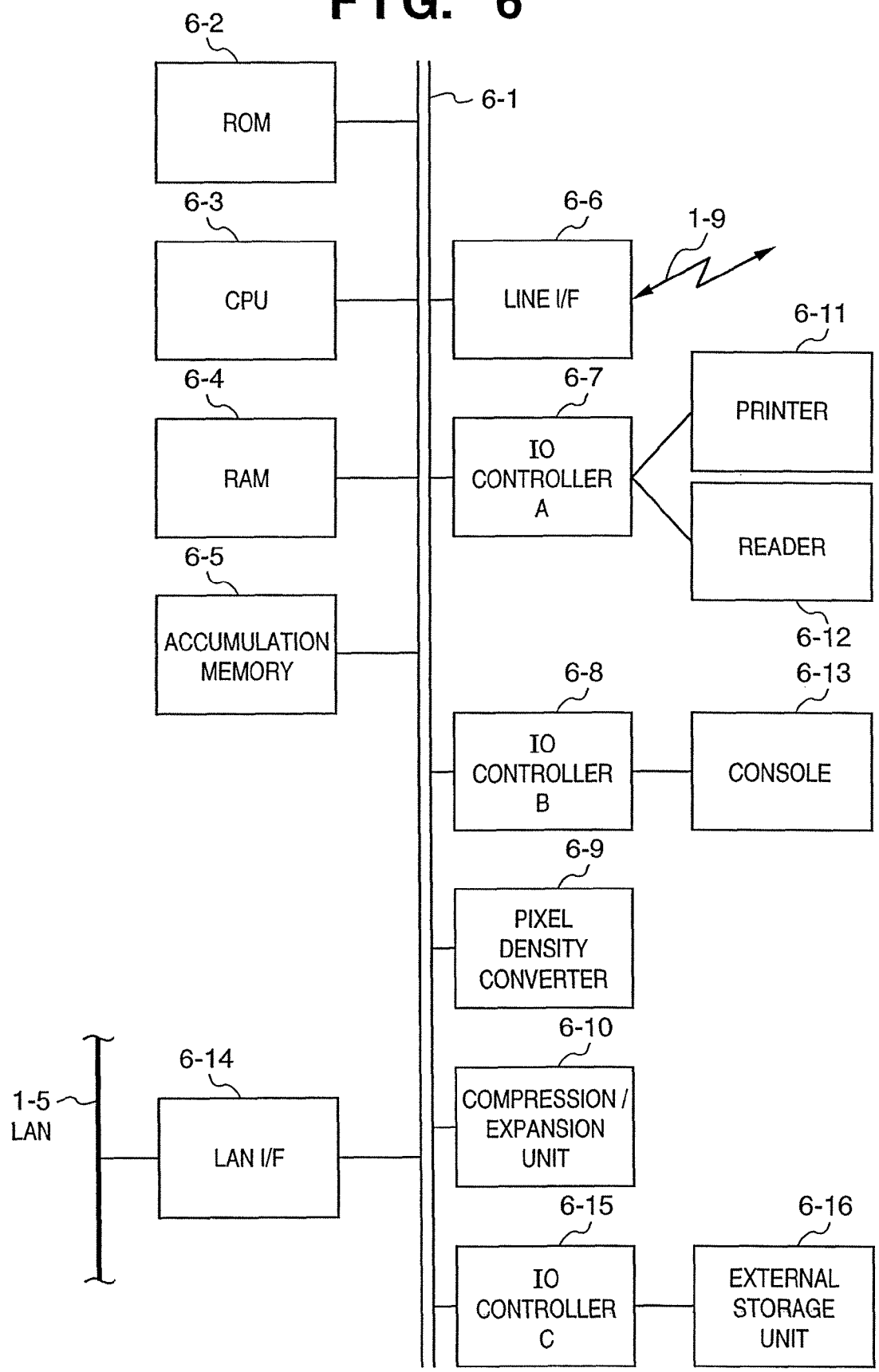
FIG. 6 is a block diagram showing the arrangement of an e-mail facsimile apparatus.

FIG. 6 is a block diagram showing the arrangement of the e-mail facsimile apparatus of this embodiment.

In FIG. 6, a ROM (read-only memory) 6-2 stores a computer program (software for controlling the entire apparatus) to be executed by a CPU 6-3. The CPU 6-3 controls the apparatus by executing a program stored in the ROM 6-2 or a RAM 6-4.

The RAM (random-access memory) 6-4 stores various data required for control and management data shown in FIG. 4, and an accumulation memory 6-5 stores encoded data for facsimile communications, and e-mail data. The RAM 6-4 stores a program loaded from an external storage unit 6-16 such as a floppy disk, CD-ROM, or the like by an IO controller (C) 6-15, and the loaded program is executed. Also, program loading onto the RAM 6-4 may be done by downloading a program from an external apparatus via a line I/F 6-6 or LAN I/F 6-14.

The line I/F 6-6 has a CCU (communication control unit), modem, NCU (network control unit), and the like for making communications via the ISDN or PSTN line, and performs call origination onto the line and communications under the control of the CPU 6-3.

An IO controller (A) 6-7 controls recording by a printer 6-11, reading by a reader 6-12, and image data transfer under the control of the CPU 6-3.

An IO controller (B) 6-8 controls a console 6-13 having a display and various keys under the control of the CPU 6-3, and transfers key input information input at the console 6-13 and various kinds of information to be displayed on the display. The console 6-13 also has a key for accessing an e-mail server (e-mail server access key).

A pixel density converter 6-9 performs resolution conversion of image data, page size conversion, millimeter/inch conversion, and the like.

A compression/expansion unit 6-10 encodes (MH, MR, MMR, or the like) image data read by the reader 6-12, and decodes received encoded data.

The LAN I/F 6-14 is an interface for connecting to the LAN, and is connected to the Internet via an equipment such as a remote router or the like connected to the LAN.

In this embodiment, bitmap data used for converting e-mail data into image data and converting characters into bitmap data are stored in the ROM 6-2 but may be loaded from the external storage unit 6-16 onto the RAM 6-4.

The arrangement of the e-mail facsimile apparatus has been described.

FIG. 4 shows the structure of management data required for facsimile termination and e-mail transmission of the e-mail facsimile apparatus 1-8 of this embodiment.

The management data are stored in the RAM 6-4, and are looked up by the CPU 6-3, which is executing the computer program in the ROM 6-2 or RAM 6-4, which program is used for running e-mail reception and facsimile/e-mail information conversion.

An own mail account 4-2 "mail_fax_machine@mail_srv.ccc.dd.ee" is the e-mail address assigned when the e-mail facsimile apparatus 1-8 transmits/receives e-mails via the e-mail server 1-2. This account is used when the e-mail facsimile apparatus 1-8 picks up e-mails addressed to the apparatus 108 from its postoffice.

In this account, "mail_fax_machine" corresponds to the postoffice name.

An own host name 4-3 "FaxMailMachine" is the host name used for identifying the e-mail facsimile apparatus 1-8 of this embodiment.

An e-mail server host name 4-4 "mail_srv" is the host name used when the e-mail facsimile apparatus 1-8 of this embodiment accesses the e-mail server 1-2.

A mode 4-5 is a software switch for selecting whether the connection to the public telephone network is disconnected or facsimile reception is started when call reception time-out is detected, a CNG signal (a tone signal for identifying a non-audio terminal) defined in ITU-T T.30 recommendation is received, or an instruction such as e-mail transfer destination information coming from a remote facsimile terminal 1-11 is undecodable when the e-mail facsimile apparatus 1-8 of this embodiment receives an incoming call from the public telephone network 1-10. The mode 4-5 is set in advance by the user via the console 6-13.

The number 4-6 of e-mail destinations indicates the number of transfer destinations of e-mail transfer information of the e-mail facsimile apparatus 1-8 designated from the public telephone network 1-10. In this case, 10 destinations are set. Information for each destinations is stored in each of a destination sequence [1] 4-1, . . . , destination sequence [i] 4-20, . . . , destination sequence [10] 4-40.

The i-th destination sequence [i] 4-20 will be explained below.

An e-mail destination 4-21 "fff@mail_srv.ccc.dd.ee" indicates the e-mail destination, i.e., a postoffice "fff" 7-2 (see FIG. 7) in the auxiliary storage device in the e-mail server 1-2.

E-mail destination identification information 4-22 "3939" is data designated by a tone signal (or DTMF signal) coming from the remote facsimile apparatus 1-11 or an SUB signal (subaddress signal)/SEP (selective polling signal) of the ITU-T T.30 recommendation.

Password information 4-23 "8280" is data designated by a tone signal (or DTMF signal) coming from the remote facsimile apparatus 1-11 or a PWD signal (password signal) of the ITU-T T.30 recommendation.

A call reception date 4-24 indicates the latest date of facsimile image data received by the e-mail facsimile apparatus 1-8 of this embodiment.

A source telephone number 4-25 stores the telephone number of the source notified from the remote facsimile apparatus 1-11 by a TSI signal of the facsimile protocol of the T.30 recommendation or a calling party telephone number notifying service.

A processing result notification service 4-26 is telephone number information registered in advance in the e-mail facsimile apparatus 1-8 of this embodiment or notified by a tone signal (DTMF signal) designated from the remote facsimile apparatus 1-11, i.e., the telephone number information of the destination to which the e-mail facsimile apparatus 108 transmits a communication result report of e-mail transmission of the received facsimile image data to a transfer destination as facsimile image data.

A reception result 4-27 stores communication result information of facsimile reception.

The number 4-28 of received pages stores information of the number of pages of facsimile-received image data (original).

Note that information in the destination sequence is appended to e-mail data as information of the facsimile reception history upon converting into e-mail data, as shown in FIG. 5.

Figure 2:
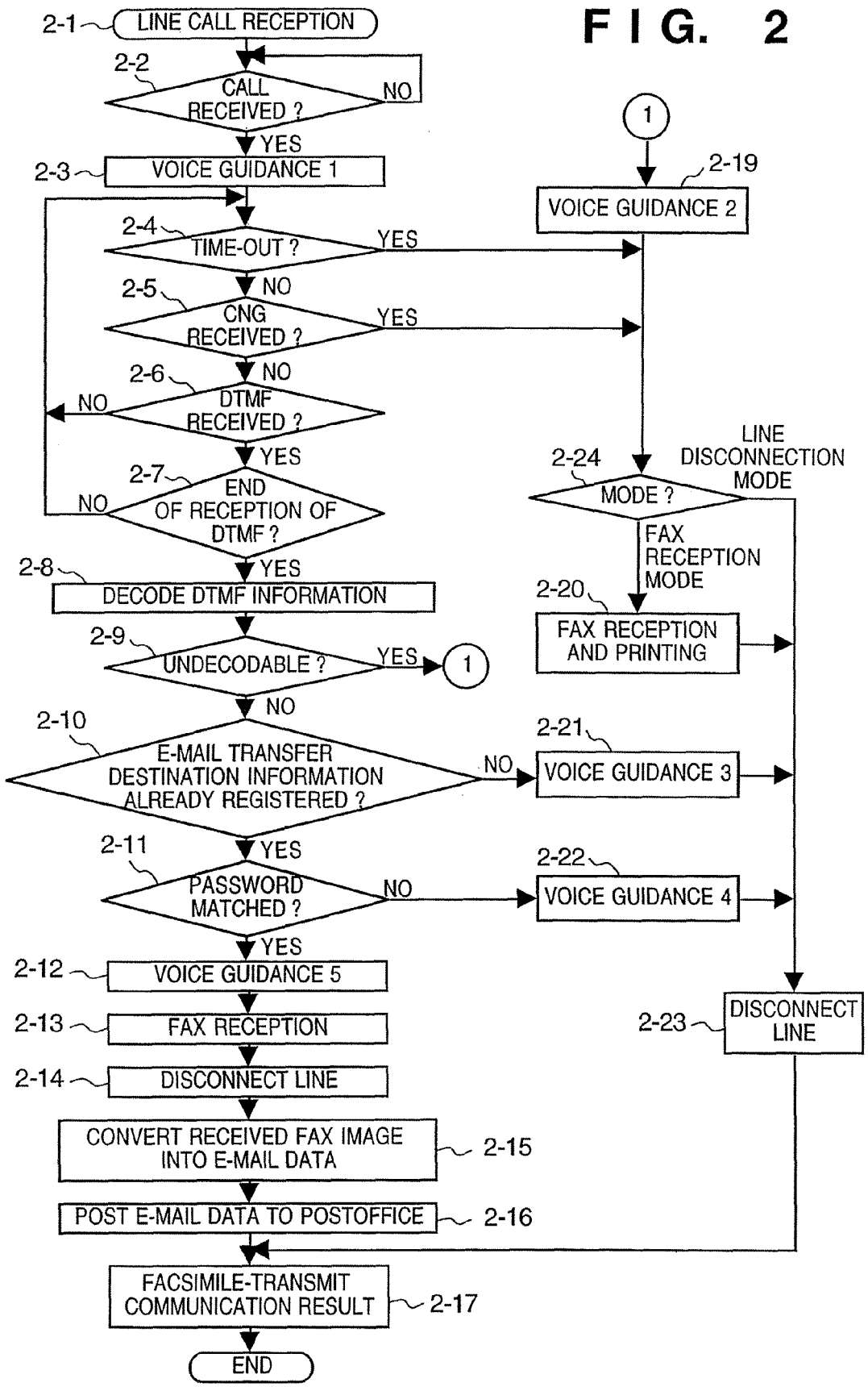
FIG. 2 is a flow chart showing the communication sequence and communication processing by an e-mail facsimile apparatus according to an embodiment of the present invention.

FIG. 2 is a flow chart showing the call reception control executed by the CPU 6-3 when the e-mail facsimile apparatus 1-8 of this embodiment receives an incoming call from the remote facsimile apparatus 1-11 via the public telephone network, and a computer program for implementing the control shown in this flow chart is stored in the ROM 6-2 or RAM 6-4.

The CPU 6-3 monitors reception of an incoming call from the public telephone network 1-10 via the line I/F 6-6 in step 2-2. Upon detecting an incoming call, in step 2-3 the CPU 6-3 controls the line I/F 6-6 to output, into the public telephone network, voice guidance 1 (e.g., an audio message "Service for transferring a facsimile image to your designated e-mail address is available. If you do not want to use the e-mail transfer service, please set originals and press the start key. If you want to use the e-mail transfer service, please tone-input #0 followed by the 4-digit e-mail transfer destination identification number, #1 followed by the 4-digit password number, and #2 followed by the telephone number of the return address of the processing result. If you already registered the return address of the processing result, you need not input the telephone number of the return address of the processing result. Finally, please input #." and so forth).

Subsequently, the CPU 6-3 checks in step 2-4 if a prescribed time has elapsed after voice guidance 1 was output, in step 2-5 if a CNG signal is received from the public telephone network, in step 2-6 if a DTMF signal is received from the public telephone network, and in step 2-7 if reception of the DTMF signal is complete.

If it is determined in step 2-4 that the prescribed time has elapsed, the flow advances to step 2-24 and the CPU 6-3 checks if the mode 4-5 in the management data shown in FIG. 4 is set in a line disconnection mode or facsimile reception mode. If the mode 4-5 is set in the facsimile reception mode, the CPU 6-3 executes facsimile reception, and controls the printer 6-11 to record image data received by the facsimile reception in step 2-20. If the facsimile reception is complete or if it is determined in step 2-24 that the mode 4-5 is set in the line disconnection mode, the CPU 603 controls the line I/F 6-6 to release the seized public telephone network in step 2-23.

If it is determined in step 2-5 that the CNG signal is received, the CPU 6-3 advances from step 2-5 to step 2-24.

The CPU 6-3 stores data of the DTMF signal (tone signal) received in step 2-6 in the RAM 6-4, and if it is determined in step 2-7 that the DTMF signal indicating sole "#" has been received (completion of reception of the DTMF signal), the flow advances to step 2-8 to decode the data of the DTMF signal stored in the RAM 6-4.

The CPU 6-3 checks based on the decoding result of the DTMF signal data in step 2-9 if the DTMF signal data in the RAM 604 is decodable. If it is determined that the data is not decodable, the flow advances to step 2-19 to control the line I/F 6-6 to output, onto the public telephone network, voice guidance 2 (e.g., an audio message "Wrong tone signals are input. Please re-input." or the like). After that, the flow advances to step 2-24.

On the other hand, if it is determined in step 2-9 that the DTMF signal data is decodable, the CPU 6-3 compares the e-mail transfer destination information received as the DTMF signal data with each e-mail destination identification information in the 10 destination sequences of the management data shown in FIG. 4 to check if they match each other in step 2-10. If the received information does not match any of the registered information, the CPU 6-3 controls the line I/F 6-6 to output, onto the public telephone network, voice guidance 3 (e.g., an audio message "Designated e-mail transfer destination is not registered. Please register." or the like), in step 2-21. After that, the flow advances to step 2-23. On the other hand, if the received information matches one of the registered information in step 2-10, the CPU 6-3 advances to step 2-11. For example, assume the remote facsimile apparatus 1-11 designates "3939", i.e., the destination sequence [i] is selected.

In step 2-11, the CPU 6-3 compares the password number received as the DTMF signal data with the password information in the designated destination sequence of the management data to check if they coincide with each other. If the password information does not match, the CPU 6-3 controls the line I/F to output, onto the public telephone network, voice guidance 4 (e.g., an audio message "wrong password. Please re-input." or the like) in step 2-22, and the flow then advances to step 2-23. On the other hand, if the password information match in step 2-11, the CPU 6-3 advances to step 2-12. For example, the password information "8280" of the destination sequence [i] has been normally received.

In step 2-12, the CPU 6-3 controls the line I/F 6-6 to output, onto the public telephone network, voice guidance 5 (e.g., an audio message "Authentication is good. Facsimile reception is ready, and please set originals, press the start key, and go on-hook" or the like). In step 2-13, the CPU 6-3 executes facsimile reception from the public telephone network. The CPU 6-3 controls its internal timer means to store the current time information in the call reception date 4-24 in the management data, extracts telephone number information of the remote facsimile apparatus from a TSI signal (transmitting station identification signal) of the protocol signal of the T.30 recommendation received from the remote facsimile apparatus, and stores the extracted telephone number information in the processing result notification facsimile destination 4-26 in the management data. For example, the CPU 6-3 stores information "03-111-2222". Also, the CPU 6-3 stores the received facsimile image information in the accumulation memory 6-5. Upon completion of the facsimile reception, the CPU 6-3 controls the line I/F 6-6 to release the seized public telephone network in step 2-14.

In step 2-15, the CPU 6-3 converts the received facsimile image data stored in the accumulation memory 6-5 into the e-mail data format shown in FIG. 5. In this case, the CPU 6-3 generates a character string of the reception processing result information in accordance with the destination sequence [i] in addition to the image data, and appends the generated information to the e-mail data. On the other hand, as for the facsimile image data, binary data obtained by converting the received MMR (Modified Modified Huffman)-encoded image data into the image file format is converted into character string data called Base64, and the converted data is inserted at the position of "facsimile image encoded by Base64" shown in FIG. 5.

In step 2-16, the CPU 6-3 converts the host name of the DNS server 1-4 into an IP address on the basis of the e-mail server host name 4-4 "mail_srv" of the management data shown in FIG. 4, and designates the e-mail address "fff@mail_srv.ccc.dd.ee" of the destination sequence [i] found in step 2-10 with respect to the e-mail server. Furthermore, the CPU 6-3 transfers (1-7 in FIG. 1) the e-mail data converted in step 2-15 to the e-mail server in accordance with the e-mail transmission protocol SMTP (Simple Mail Transfer Protocol recommended by IETF) shown in FIG. 3.

In step 2-17, the CPU 6-3 generates a character string of result information including the communication result of the e-mail transfer executed in step 2-16, and converts the generated character string information into facsimile image data as a communication result report. The CPU 6-3 then controls the line I/F 6-6 to automatically place a call to the facsimile apparatus designated by the information in the processing result notification facsimile destination 4-26 in the management data, thus facsimile-transmitting the converted facsimile image data.

In the embodiment described above, the e-mail transfer destination information and password information are received as the DTMF signal data. Alternatively, the e-mail destination identification information (e-mail transfer destination information) shown in FIG. 4 may be received by a subaddress signal (SUB signal) or selective polling signal (SEP signal) as a protocol signal of the T.30 recommendation option, and the password number may be received by a password signal (PWD signal) as a protocol signal of the T.30 recommendation option. In this case, the CPU 6-3 checks in the facsimile reception in step 2-20 if the SUB or SEP signal, and PWD signal have been received. If the SUB or SEP signal, and PWD signal have been received, the CPU 6-3 executes the processing in steps 2-10 and 2-11 to check the e-mail transfer destination information and password number. If the e-mail transfer destination information and password number match, the CPU stores the received facsimile image data in the accumulation memory 6-5, and the flow advances to step 2-14.

The protocol for sending an e-mail from the e-mail facsimile apparatus 1-8 of this embodiment to the e-mail server or a communication apparatus with an e-mail reception function via the network will be explained below with reference to FIG. 3.

The protocol shown in FIG. 3 is the Simple Mail Transfer Protocol as an e-mail transfer protocol recommended by IETF.

The e-mail facsimile apparatus 1-8 starts a session with the e-mail server 1-2 based on an SMTP port number via the TCP/IP (3-3). The e-mail server 1-2 sends back a normal reply (3-4).

The e-mail facsimile apparatus 1-8 sends its own host name "FaxMailMachine" to the e-mail server 1-2 (3-5), which confirms that the apparatus 1-8 is the host that can receive a service, and sends back a normal reply to the e-mail facsimile apparatus 1-8 (3-6).

Subsequently, the e-mail facsimile apparatus 1-8 sends the sender address "fax_mail_machine@mail_srv.ccc.dd.ee" of the e-mail (3-7), and the e-mail server 1-2 returns a normal reply to the e-mail facsimile apparatus 1-8 (3-8). The e-mail facsimile apparatus 1-8 sends the e-mail address "fff@mail_srv.ccc.dd.ee" (e-mail client 1-6), to which the received facsimile image data converted into e-mail data is to be sent, to the e-mail server 1-2 (3-9), and the e-mail server 1-2 returns a normal reply to the e-mail facsimile apparatus 1-8 (3-10).

The e-mail facsimile apparatus 1-8 notifies the e-mail server 1-2 of the start of transfer of e-mail data (3-11), and the e-mail server 1-2 sends back a normal reply to the e-mail facsimile apparatus 1-8 (3-12).

The e-mail facsimile apparatus 1-8 transfers e-mail data shown in FIG. 5 to the e-mail server 1-2 (3-13), and notifies the e-mail server 1-2 of the end of transfer of the e-mail data (3-14). The e-mail server 1-2 returns a normal reply to the e-mail facsimile apparatus 1-8 (3-15). The e-mail facsimile apparatus 1-8 notifies the e-mail server 1-2 of the end of the SMTP session (3-16), and the e-mail server 1-2 returns a normal reply to the e-mail facsimile apparatus 1-8 (3-17). Finally, the e-mail facsimile apparatus 1-8 notifies the e-mail server 1-2 of release of the session (3-18).

The processing for converting the facsimile image data received by the e-mail facsimile apparatus 1-8 of this embodiment into e-mail data, the e-mail data format, and history information of facsimile reception to be added to the e-mail data will be explained below with reference to FIG. 5.

FIG. 5 shows the contents of a text file described in MIME ("Multipurpose Internet Mail Extensions" as the e-mail data format recommended by IETF). The text file is divided into three sections by "-Boundary-" separator lines, so that the first section describes a mail header, the second section describes the history information of the reception result of the received facsimile image data, and the third section describes identification information of the file format, the Base encoding used for converting binary data into a character string, and the like, and character data obtained by converting binary data, which is obtained by converting three pages of received facsimile image data into a certain binary image file format, into a character string according to Base64, to sandwich a blank line therebetween.

The management pattern of postoffices (mailboxes) in the e-mail server to which the e-mail facsimile apparatus 1-8 of this embodiment sends e-mail data will be described below with reference to FIG. 7.

FIG. 7 shows the directory structure in the auxiliary storage device of the e-mail server 1-2. The postoffices in the server are created as subdirectories underneath a directory "maildir" 7-1. A directory "fff" 7-2 is a postoffice for the e-mail client 1-6. The e-mail data which has been sent from the e-mail facsimile apparatus 1-8 of this embodiment to that client is stored in the postoffice "fff" 7-2. For example, the e-mail shown in FIG. 5 is stored in this postoffice as, e.g., a file "mail_file03.mime" 7-4. The stored e-mail is downloaded from the directory "fff" 7-2 by the e-mail client 1-6 using the POP3 protocol.

According to the aforementioned embodiment, facsimile image data received not from a facsimile apparatus using the own mode but from a facsimile apparatus using a standard protocol complying with the popular ITU-T T.30 recommendation can be transferred to the e-mail address designated by the operator of that source facsimile apparatus. As a result, the following effects are expected.

(1) Great Reduction of Network Building Cost

For example, upon building a system which allows data exchange between facsimile data and e-mail data, when the e-mail facsimile apparatus of this embodiment is applied, a facsimile apparatus used so far can be used as a virtual Internet FAX apparatus, and all existing facsimile apparatuses need not be replaced by Internet FAX apparatus, thus building the system with very low cost.

(2) Great Improvement of User Transfer Efficiency by Unifying Information

For example, since the user can post facsimile data addressed to himself or herself as e-mails to his or her postoffice (or mailbox) via the e-mail facsimile apparatus of this embodiment, both the e-mails and facsimile image data can be processed as e-mails. For this reason, the user need not physically go to the facsimile apparatus to pick up received originals, and need not sort the received originals addressed to him or her. Hence, information can be unified, and the received originals are never lost.

In the above embodiment, the facsimile apparatus has been exemplified as a communication apparatus. Alternatively, the functions of the above-mentioned e-mail facsimile apparatus may be implemented by a personal computer with a modem that can communicate with the public telephone network.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes for executing processing corresponding to the above-mentioned flow chart.

As many apparently widely different embodiments of the present invention can be made without departing from the spirit and scope thereof, it is to be understood that the invention is not limited to the specific embodiments thereof except as defined in the appended claims.

What I claim is:

1. A facsimile apparatus comprising: a receiver, that receives image data according to a facsimile procedure through a telephone network from a sender apparatus; a clock unit, that indicates a current time; a converter, that converts the image data received by said receiver into an image file, generates text data regarding reception result information including at least a reception time based on the current time indicated by said clock unit when the image data is received by said receiver and a telephone number corresponding to the sender apparatus of the received image data, and converts the converted image file and the generated text data, into e-mail data in which the image file is inserted in one part and the text data not including the image file is inserted in another part under MIME format, both of the parts being other than a mail header section; a transmitter, that transmits the e-mail data obtained by said converter to a receiver apparatus that is other than the sender apparatus through a computer network; said transmitter transmits the e-mail data to a destination specified by information received by said receiver; a printer that prints an image based on the image data received by said receiver; and a controller that controls such that the image data received by said receiver is transmitted by said transmitter in a case where the information for specifying the destination is received by said receiver, and the image based on the image data received by said receiver is printed by said printer in a case where the information for specifying the destination is not received by said receiver.

2. A method for a facsimile apparatus comprising the steps of: receiving image data according to a facsimile procedure through a telephone network from a sender apparatus; converting the received image data into an image file, generating text data regarding reception information including at least a reception time based on a current time indicated by a clock unit of the facsimile apparatus when the image data is received by the facsimile apparatus and a telephone number corresponding to the sender apparatus of the received image data, and converting the converted image file and the generated text data, into e-mail data in which the image file is inserted in one part and the text data not including the image file is inserted in another part under MIME format, both of the parts being other than a mail header section; transmitting the e-mail data obtained by the converting step to a receiver apparatus that is other than the sender apparatus through a computer network; transmitting the e-mail data to a destination specified by the image date received; printing an image based on the image data received; and controlling such that the image data received is transmitted in a case where the information for specifying the destination is received, and the image based on the image data received is printed in a case where the information for specifying the destination is not received.

3. A non-transitory computer-readable medium encoded with a computer program configured to be executed at least by a computer in a facsimile apparatus, the computer program comprising: program code for receiving image data according to a facsimile procedure through a telephone network from a sender apparatus; program code for converting the received image data into an image file, generating text data regarding reception information including at least a reception time based on a current time indicated by a clock unit of the facsimile apparatus when the image file is received by the facsimile apparatus and a telephone number corresponding to the sender apparatus of the received image data, and converting the converted image file and generated text data into e-mail data in which the image file is inserted in one part and the text data not including the image file is inserted in another part under MIME format, both of the parts being other than a mail header section; program code for transmitting the e-mail data obtained by the program code for converting to a receiver apparatus that is other than the sender apparatus through a computer network; program code for transmitting the e-mail data to a destination specified by the image date received; program code for printing an image based on the image data received; and program code for controlling such that the image data received is transmitted in a case where the information for specifying the destination is received, and the image based on the image data received is printed in a case where the information for specifying the destination is not received.

* * * * *